(12) United States Patent
Yeh

(10) Patent No.: US 8,652,630 B2
(45) Date of Patent: Feb. 18, 2014

(54) FOAM PRODUCT AND METHOD OF MAKING THE SAME

(76) Inventor: Tzong In Yeh, Fremont, CA (US)

(*) Notice: Subject to any disclaimer, the term of this patent is extended or adjusted under 35 U.S.C. 154(b) by 53 days.

(21) Appl. No.: 12/982,524

(22) Filed: Dec. 30, 2010

(65) Prior Publication Data

US 2011/0097569 A1  Apr. 28, 2011

Related U.S. Application Data

(63) Continuation-in-part of application No. 12/155,953, filed on Jun. 12, 2008, now abandoned.

(30) Foreign Application Priority Data

Nov. 30, 2010  (TW) .............................. 099141578 A

(51) Int. Cl.
*B32B 3/26* (2006.01)
*B32B 7/12* (2006.01)

(52) U.S. Cl.
USPC .......... 428/316.6; 428/317.1; 428/71

(58) Field of Classification Search
USPC .................. 428/316.6, 309.9, 131, 317.1, 71
See application file for complete search history.

(56) References Cited

U.S. PATENT DOCUMENTS

| | | | |
|---|---|---|---|
| 2,962,746 A * | 12/1960 | Heroy, Jr. et al. ............ 15/244.1 |
| 4,642,321 A | 2/1987 | Schoenberg et al. | |
| 4,798,549 A | 1/1989 | Hirsch | |
| 5,228,183 A * | 7/1993 | Saeki ........................... 29/527.3 |
| 5,916,006 A * | 6/1999 | Ganson ........................ 446/85 |
| 2004/0074007 A1* | 4/2004 | Gladney ............................ 5/727 |
| 2006/0003044 A1 | 1/2006 | DiNello et al. | |
| 2007/0155261 A1 | 7/2007 | Cheung | |
| 2008/0248701 A1* | 10/2008 | Yeh ................................ 441/65 |
| 2008/0292868 A1* | 11/2008 | Logan ........................ 428/319.9 |
| 2010/0218313 A1* | 9/2010 | Gogolev ........................ 5/200.1 |
| 2010/0229308 A1* | 9/2010 | Pearce et al. .................... 5/655.5 |
| 2011/0316198 A1* | 12/2011 | Schips et al. ............. 264/331.16 |

FOREIGN PATENT DOCUMENTS

TW  200946573  11/2009
WO  WO 2010100101 A1 *  9/2010

OTHER PUBLICATIONS

Translation of JP 10-080337, Yoshihiko Sugimoto, "Inclinable Headrest", Mar. 31, 1998, 4 pages.*

* cited by examiner

*Primary Examiner* — Hai Vo
(74) *Attorney, Agent, or Firm* — Muncy, Geissler, Olds & Lowe, PLLC

(57) ABSTRACT

The foam product includes a foam body, a connection block, an accessory and an adhesive layer. The foam body is formed of expandable polystyrene (EPS). The connection block is formed of a copolymer of expandable polyolefin and expandable polystyrene, and is completely or partially embedded inside the foam body. The accessory is made of non-expandable material and is completely or partially embedded inside the connection block. The accessory and the connection block are bonded by the adhesive layer.

10 Claims, 4 Drawing Sheets

FOAM PRODUCT AND METHOD OF MAKING THE SAME

CROSS REFERENCE TO RELATED APPLICATION

This is a continuation-in-part of a U.S. patent application Ser. No. 12/155,953, filed on Jun. 12, 2008 now abandoned.

BACKGROUND OF INVENTION

1. Field of Invention

The present invention relates to a foam product and pertains particularly to a foam product equipped with an accessory therein, and method of making same.

2. Related Prior Art

A conventional method of making a foam product with an accessory embedded therein includes the steps of digging a hole in a foamed body, and then having the accessory adhered to the hole of the foam body via adhesives. In this way, a foam product with the embedded accessory can be easily formed. However, the bonding strength between the accessory and the foam body is quite weak because the bond exists only between the outer surface of the accessory and the inner wall of the hole of the foam body. As a result, the accessory of the conventional foam product is prone to fall off the foam body after use for a period of time.

FIG. 9 illustrates another prior art foam product embedded with an accessory. The accessory 6 is composed of a male fastener 60 and a female fastener 61 engaged with each other. As shown, the male fastener 60 and the female fastener 61 are received in a through bore 50 of a foam body 5 of the foam product and screwed with each other to secure the accessory 6 firmly embedded in the foam body 5. However, since the accessory 6 is often suffered from collision while use, the through bore 50 of the foam body 5 may be enlarged little by little by the solid accessory 6. That is, the accessory 6 may become prone to sway or even fall off the foam body 5 after long-term use.

Another method of making a foam product with an accessory embedded therein can be found in U.S. Pat. No. 4,798,549, US Patent Publication No. 2006/003044 or Taiwan Patent Publication No. 200946573.

SUMMARY OF INVENTION

The present invention relates a foam product which includes a foam body, a connection block embedded inside the foam body, an accessory embedded inside the connection block, and an adhesive layer. The foam body is made of a first foam material. The connection block is made of a second foam material. The accessory and the connection block are tightly bonded by the adhesive layer. The connection block is employed to connect the accessory and the foam body in order to prevent the accessory from falling off the foam body.

Preferably, the first foam material and the second foam material are the same material, and both are expandable polystyrene (EPS), for example.

Alternatively, the connection block made of the second foam material is more flexible and tougher than the foam body made of the first foam material, which renders that connecting block has a flexibility and a toughness respectively greater than that of the foam body. For example, the first foam material is EPS and the second foam material is a copolymer of expandable polyolefin and EPS, wherein the expandable polyolefin may be expandable polyethylene (EPE), for example.

Preferably, the accessory is stiffer than the foam body and the connection block, and is made of a material, such as plastic or metal, that differs from that of the foam body and the connection block.

Preferably, the connection block includes a plurality of foam beads joined together, and the adhesive layer partially extends into gaps between the foam beads. This enables the accessory to be firmly grasped and adhered inside the connection block. The adhesive layer is substantially made of a thermoplastic adhesive material, such as hot melt adhesive.

The present invention also relates to a method of making a foam product, which includes the steps of coating a layer of thermoplastic adhesive material on an accessory; placing the coated accessory into a cavity of a first mold; introducing a second foam material into the cavity of the first mold; heating the first mold in order to turn the second foam material into a connection block and to create a bond between the accessory and the connection block via the thermoplastic adhesive; placing the connection block together with the accessory into a cavity of a second mold; introducing the first foam material into the cavity of the second mold; and heating the second mold in order to turn the first foam material into a foam body encasing the connection block.

Preferably, the first foam material is EPS, and the second foam material is a copolymer of expandable polyolefin and EPS, wherein the expandable polyolefin may be EPE, for example.

Preferably, the accessory is substantially made of plastic, and the thermoplastic adhesive material is hot melt adhesive.

According to the present invention, the accessory is securely joined to the foam body by the connection block, and the connection block acts as a buffer block against the stress coming from the accessory. Since the stress is reduced, the embedded accessory can be protected from falling off the foam body.

The present invention and the advantages thereof will become more apparent upon consideration of the following detailed description when taken in conjunction with the accompanying drawings.

BRIEF DESCRIPTION OF DRAWINGS

FIGS. 2-8 illustrate a method of making the foam product of FIG. 1; wherein:

FIG. 2 is a cross section of an accessory coated with a thermoplastic adhesive material;

FIG. 3 is a cross section of the coated accessory and a plurality of pre-foamed pellets placed in a cavity of a first mold;

FIG. 4 is a cross section of the pre-foamed pellets expanding in the first mold;

FIG. 5 is a cross section of a combination of the connection block and the accessory;

FIG. 6 is a cross section of the connection block, the accessory, and a plurality of pre-foamed pellets placed in a cavity of a second mold;

FIG. 7 is a cross section of the pre-foamed pellets expanding in the second mold; and FIG. 8 is a cross section of the foam product.

DETAILED DESCRIPTION OF PREFERRED EMBODIMENT

Figure 1:
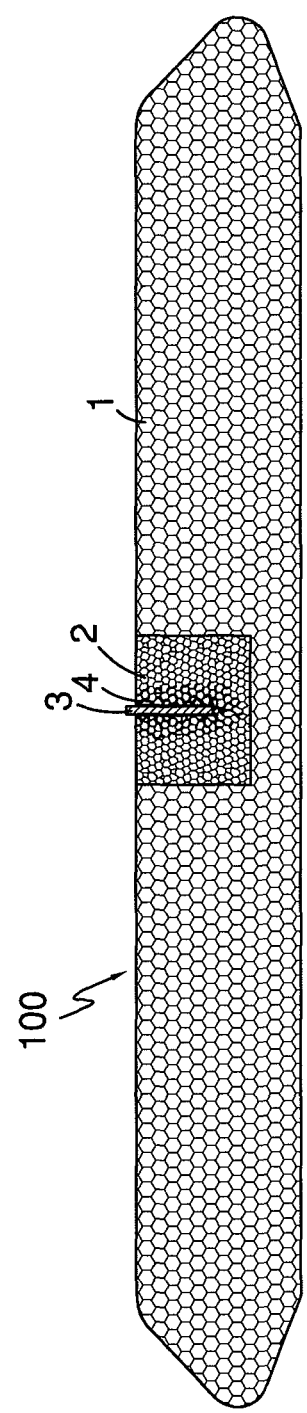
FIG. 1 is a cross section of a foam product in accordance with the preferred embodiment of the present invention.

As shown in FIG. 1, there is provided with a foam product 100 according to the preferred embodiment of the present invention. The foam product 100 includes a foam body 1, a connection block 2 embedded in the foam body 1, an accessory 3 embedded in the connection block 2, and an adhesive layer 4 creating a bond between the connection block 2 and the accessory 3.

In general, the foam body 1 is a core board of a sports board, such as a surfboard, a snow ski, a water ski, a float board for live-saving or entertainment, etc. The accessory 3 may be, but not limited to, a holder or a sail pole. The holder relates to a base for carrying a component, such as a surfboard fin, a handle or a brake plate of a ski. In this preferred embodiment, the accessory 3 is mainly made of a non-expandable material such as, but not limited to, plastic or metal. The connection block 2 is completely or partially embedded in the foam body 1, and the accessory 3 is completely or partially embedded inside the connection block 2.

The foam body 1 and the connection block 2 may be made of same foam material or preferably different foam materials which enable the connection block 2 to be more flexible and tougher than the foam body 1.

Compared to a prior art method of making a foam product by directly having an accessory adhered into a foam body, the method of the present invention comprises the steps of embedding the accessory 3 inside the connection block 2 first and then embedding the connection block 2 with the accessory 3 inside the foam body 1 in order to protect the accessory 3 from coming off the foam body 1. Since the connection block 1 has more outer surfaces than the accessory 3, the bonding strength of the interface between the foam body 1 and the connection block 2 is larger, and the stress from the accessory 3 can be reduced by the connection block 2.

In this preferred embodiment, the foam body 1 is made of EPS which has characteristics such as light weight and good buoyancy. The connection block 2 is made of a copolymer of expandable polyolefin and EPS in order to have the connection block 2 more flexible and tougher than the foam body 1 to buffer against the stress from the accessory 3. In other words, the connection block 2 has a flexibility and a toughness respectively greater than that of the foam body 1.

In this preferred embodiment, the expandable polyolefin of the copolymer is EPE, a member of expandable polyolefin family. That is, the foam body 1 is made of a copolymer of EPE and EPS. The ratio of EPE and EPS may be adjusted as required. For example, the copolymer contains approximately 30 percent by weight EPE and 70 percent by weight EPS.

Figure 2:
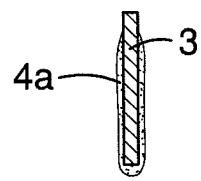

FIGS. 2-8 illustrate a method of making the foam product 100 according to this invention. The method includes the following steps: First, as shown in FIG. 2, a layer of thermoplastic adhesive material 4a is coated on an accessory 3 which is to be disposed in the foam product when it is complete, as will be described later. The thermoplastic adhesive material 4a, such as hot melt adhesive, is able to securely stick itself on the accessory 3 and is a kind of material that melts into viscous liquid when being heated up to some certain temperature but transforms into solid state while cooling. The material of the accessory 3 may be selected from metal, wood, plastic, fiber glass, carbon fibers or other composite materials.

Figure 3:
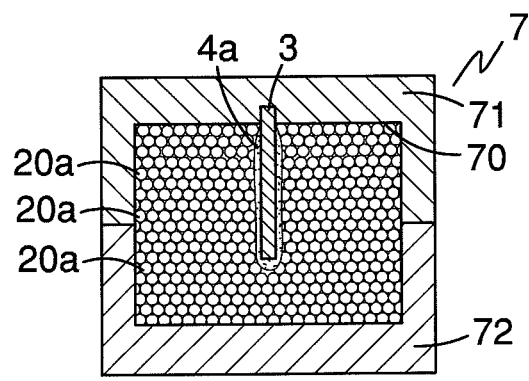

Next, as shown in FIG. 3, the accessory 3 which is coated with thermoplastic adhesive material 4a is placed into a cavity 70 of a first mold 7. The first mold 7 includes an upper die half 71 and a lower die half 72. The upper and lower die halves 71, 72 co-define the cavity 70 of the first mold 7. After the accessory 3 is fixed inside the first mold 7, a second foam material is introduced into the cavity 70 of the first mold 7. The second foam material may be a plurality of pre-foamed pellets 20a each made of a copolymer of expandable polyolefin and EPS. Preferably, each of the pre-foamed pellets is made of a copolymer of EPE and EPS. It is noted that the cavity 70 of the first mold 7 should be roughly filled up with the pre-foamed pellets 20a although there are still some gaps left among the pre-foamed pellets 20a as well as between the pre-foamed pellets 20a and inner walls of the cavity 70 of the first mold 7. In any case, the pre-foamed pellets 20a should be sufficient in quantity to be formed into the connection block 2, as will be described hereinafter.

Figure 4:
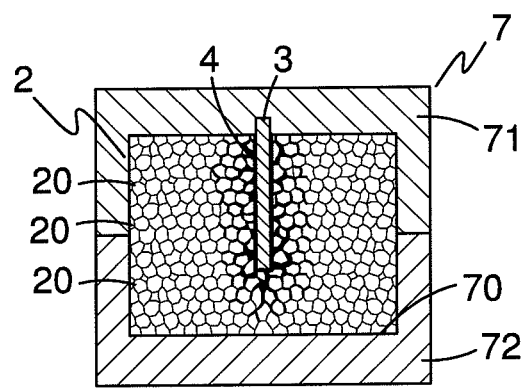

As shown in FIG. 4, the first mold 7 is then heated to transform the pre-foamed pellets 20a into a plurality of foam beads 20. During the heating process and under the pressure from the first mold 7, the foam beads 20 are bonded together to form a connection block 2 with a shape corresponding to that of the cavity 70 of the first mold 7. During this molding process, the thermoplastic adhesive material 4a melts because of the heat and penetrates from the outer surfaces of the accessory 3 into the gaps among the adjacent foam beads 20 of the connection block 2 because of the pressure from the first mold 7, and finally is turned into an adhesive layer 4.

Figure 5:
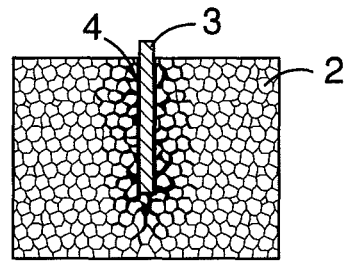

In this embodiment, especially during the heating process, a jet stream of high-temperature and high-pressure fluid is introduced into the cavity 70 of the mold 7. Under the high-temperature stream, the pre-foamed pellets 20a are expanded or re-foamed in volume and the pre-foamed pellets have their outer surfaces which directly contact with the outside stream melt. Meanwhile, the thermoplastic adhesive material 4a melts into viscous liquid and is further pushed by the pressure of the mold 7 to penetrate into the gaps among the foam beads 20 of the connection block 2 that surround the accessory 3. At this time, a clamping force exerted upon the upper die half 71 and the lower die half 72 of the first mold 7 must be adequate to sustain the stream pressure inside the first mold 7 and the thermal expansion pressure of the pre-foamed pellets 20a from uncovering the first mold 7. After a scheduled time, or called after the foam molding process, the half-finished product of the connection block 2 with the accessory 3 embedded therein is complete and may be taken out of the first mold 7, as shown in FIG. 5. It is noted that the adhesive layer 4 is shaped like fibrous roots and has branches penetrating into the gaps among the associated foam beads 20 that surround the accessory 3, and therefore firmly grasps the accessory 3 inside the connection block 2.

Preferably, a plurality of aforementioned connection blocks 2 may be made at a time. Specifically, a plurality of accessories 3 are provided and placed in a mold which is bigger than the first mold 7 to form a bigger foam block with the accessories 3 embedded therein. The foam block can then be cut and divided into pieces each having one of the accessories 3, namely the connection block 2. In this way, a number of connection blocks can be made more efficiently.

Figure 6:
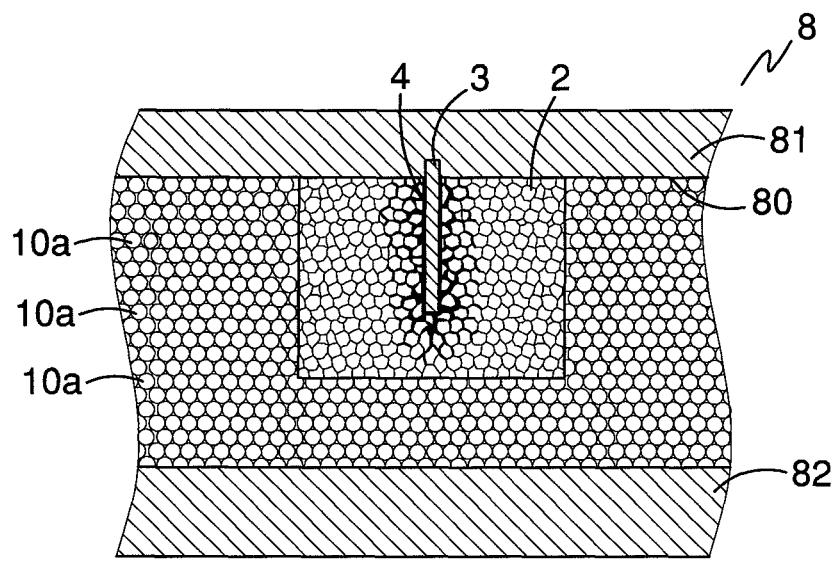

Next, as shown in FIG. 6, the connection block 2 together with the accessory 3 is placed into a cavity 80 of a second mold 8. The second mold 8 is bigger than the first mold 7 and also includes an upper die half 81 and a lower die half 82. The first and second die halves 81, 82 co-define the cavity 80 of the second mold 8. After the connection block 2 together with the accessory 3 is fixed in the second mold 8, a first foam material is introduced into the cavity 80 of the second mold 8. The first foam material may be a plurality of pre-foamed pellets 10a each made of expandable polystyrene. Similarly, the cavity 80 of the second mold 8 should be roughly filled up with the pre-foamed pellets 10a although there are still some gaps left among the pre-foamed pellets 10a and also between the pre-foamed pellets 10a and inner walls of the cavity 80. In any case, the pre-foamed pellets 10*a* must be sufficient in quantity to be formed into the foam body 1, as will be described hereinafter.

Figure 7:
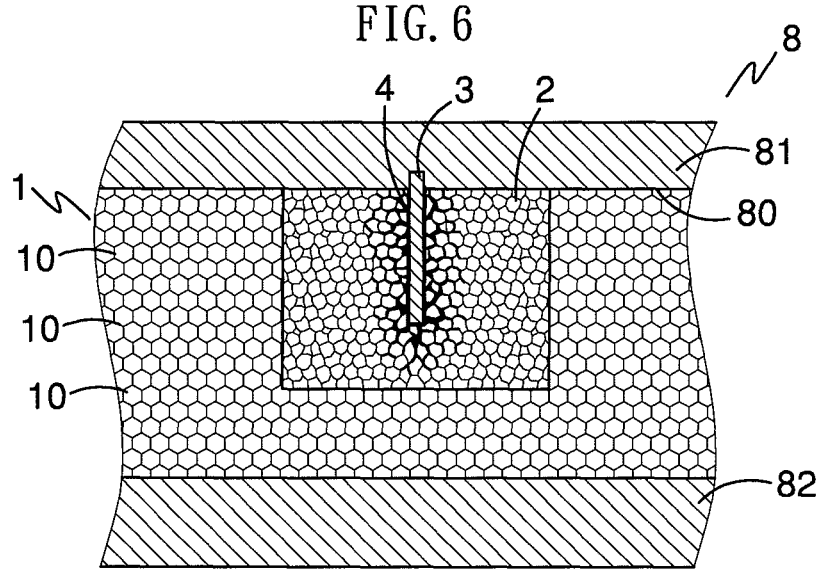
Figure 8:
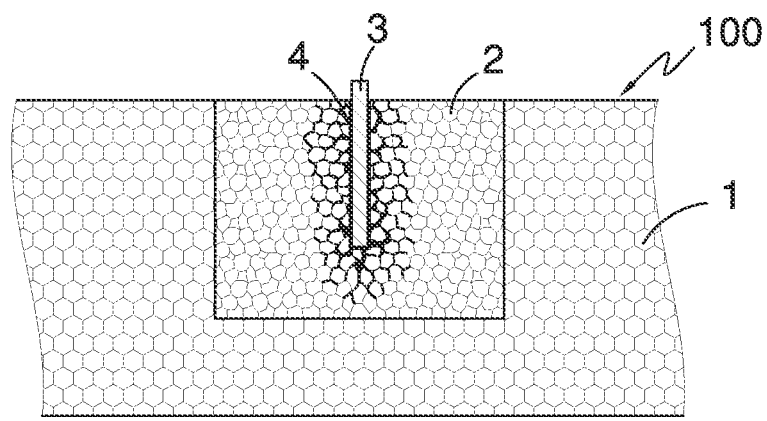
Figure 9:
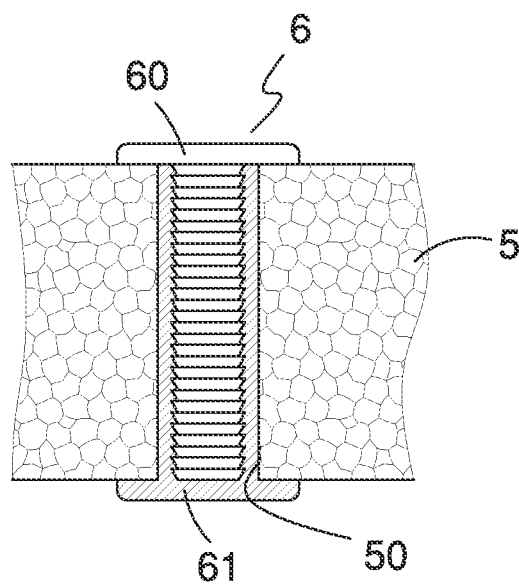
FIG. 9 is a cross section of a conventional foam body.

Afterward, as shown in FIG. 7, the second mold 8 is heated, as described in the aforementioned heating process, to transform the pre-foamed pellets 10*a* into a plurality of foam beads 10. The foam beads 10 are bonded together to form a foam body 1 with a shape corresponding to that of the cavity 80 of the second mold 8, and the foam body 1 bonds itself to the connection block 2. Since the foam body 1 and the connection block 2 both employs EPS as their material, a tight bond therebetween can be directly generated without extra adhesives. Finally, after the foaming process is finished, the foam product 100 is complete and can be taken out of the second mold 8, as shown in FIG. 8.

From the above description, the adhesive layer 4 passes through or extends into the gaps among the associated foam beads 20 that surround the accessory 3, and therefore improves the bonding strength between the accessory 3 and the connection block 2. In this way, the accessory 3 can be firmly adhered inside the connection block 2. On the other hand, since the connection block 2 is more flexible and tougher than the foam body 1, the connection block 2 that surround the accessory 3 is able to buffer against the stress from the accessory 3 and keep the foam body 1 from being affected. Moreover, the interface between the connection block 2 and the foam body 1 is big enough to ensure that the connection block 2 and the foam body 1 can be tightly bonded with each other. Furthermore, the connection block 2 made of the aforementioned copolymer and the foam body 1 made of EPS can be directly bonded together without the use of adhesives. In any case, the accessory 3 is securely coupled with the foam body 1 via the connection block 2 and is not easy to fall off the foam body 1.

It will be appreciated that although a particular embodiment of the invention has been shown and described, modifications may be made. It is intended in the claims to cover such modifications which come within the spirit and scope of the invention.

The invention claimed is:

1. A foam product comprising:
    a foam body made of a first foam material, wherein the first foam material is expandable polystyrene (EPS);
    a connection block made of a second foam material and completely or partially embedded inside the foam body, wherein the connection block is bonded with the foam body and the second foam material is a copolymer of expandable polyolefin and expandable polystyrene;
    an accessory completely or partially embedded inside the connection block and in contact with the connection block, wherein a part of the accessory is exposed outside of a surface of the foam body; and
    an adhesive layer located between the connection block and the accessory and creating a bond between the connection block and the accessory.

2. The foam product of claim 1, wherein the connection block is more flexible and tougher than the foam body.

3. The foam product of claim 1, wherein the expandable polyolefin is expandable polyethylene (EPE).

4. The foam product of claim 3, wherein the copolymer contains approximately 30 percent by weight EPE and 70 percent by weight EPS.

5. The foam product of claim 1, wherein the accessory is stiffer than the foam body and the connection block and the accessory is made of a material that differs from that of the foam body and the connection block.

6. The foam product of claim 1, wherein the accessory is substantially made of plastic.

7. The foam product of claim 1, wherein the exposed part of the accessory protrudes above the surface of the foam body.

8. The foam product of claim 1, wherein the accessory is a holder to carry a component therein.

9. The foam product of claim 1, wherein the accessory is a pole.

10. The foam product of claim 1, wherein the connection block has a surface flush with the surface of the foam body.

* * * * *